United States Patent
Zhuang et al.

(10) Patent No.: US 9,848,341 B2
(45) Date of Patent: Dec. 19, 2017

(54) NETWORK OPTIMIZATION METHOD, AND NETWORK OPTIMIZATION DEVICE

(71) Applicant: Huawei Technologies Co., Ltd., Shenzhen (CN)

(72) Inventors: Hongcheng Zhuang, Shenzhen (CN); Jietao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 14/927,184

(22) Filed: Oct. 29, 2015

(65) Prior Publication Data
US 2016/0050571 A1    Feb. 18, 2016

Related U.S. Application Data

(63) Continuation of application No. PCT/CN2013/075055, filed on May 2, 2013.

(51) Int. Cl.
*H04W 24/02* (2009.01)
*H04W 24/08* (2009.01)

(52) U.S. Cl.
CPC ............ *H04W 24/02* (2013.01); *H04W 24/08* (2013.01)

(58) Field of Classification Search
None
See application file for complete search history.

(56) References Cited

U.S. PATENT DOCUMENTS

| 9,301,154 | B2 * | 3/2016 | Hamalainen | ........ | H04W 72/046 |
| 2005/0064820 | A1 * | 3/2005 | Park | ...................... | H04W 24/00 |
| | | | | | 455/67.11 |

(Continued)

FOREIGN PATENT DOCUMENTS

| CN | 101964985 A | 2/2011 |
| CN | 102075941 A | 5/2011 |

(Continued)

OTHER PUBLICATIONS

Altman, "Design and evaluation of self-optimisation algorithms for radio access networks," Orange Labs, Santander, Spain (Jun. 9, 2009).

(Continued)

*Primary Examiner* — Duc Duong
(74) *Attorney, Agent, or Firm* — Leydig, Voit & Mayer, Ltd.

(57) ABSTRACT

Embodiments of the present disclosure provide a network optimization method and a network optimization device. The method includes: acquiring, in a first time segment, a first network status parameter that is determined according to M groups of network status parameters of at least one target cell, and acquiring a first CP that is determined according to M groups of cell control parameters CPs of the target cell, where the network status parameters include a key performance parameter KPI and a cell measurement parameter, determining, according to the first network status parameter and from a first entry that records a mapping relationship between a network status parameter and a security status, a security status of the target cell in the first time segment; and performing network optimization on the target cell according to the security status of the target cell in the first time segment.

20 Claims, 3 Drawing Sheets

(56) References Cited

U.S. PATENT DOCUMENTS

| | | |
|---|---|---|
| 2009/0227251 A1 | 9/2009 | Lei et al. |
| 2012/0002567 A1 | 1/2012 | Sun et al. |
| 2013/0031036 A1 | 1/2013 | Kojima |
| 2013/0170362 A1* | 7/2013 | Futaki .................. H04W 24/02 370/241.1 |
| 2014/0269364 A1* | 9/2014 | Knapp ................. H04W 84/18 370/252 |
| 2015/0043386 A1* | 2/2015 | Racz .................... H04L 41/044 370/255 |
| 2015/0237546 A1* | 8/2015 | Lin ....................... H04W 36/08 455/436 |

FOREIGN PATENT DOCUMENTS

| | | |
|---|---|---|
| CN | 102150450 A | 8/2011 |
| WO | WO 2012072445 A1 | 6/2012 |

OTHER PUBLICATIONS

Dirani et al., "A Cooperative Reinforcement Learning Approach for Inter-Cell Interference Coordination in OFDMA Cellular Networks," Proceedings of the $8^{th}$ International Symposium on Modeling and Optimization in Mobile, Ad Hoc and Wireless Networks (WiOpt), pp. 170-176 (2010).

* cited by examiner

100

```
┌─────────────────────────────────────────────────────────────┐
│ Acquire, in a first time segment, a first network status parameter that is │
│   determined according to M groups of network status parameters of at      │
│  least one target cell, and acquire a first CP that is determined according│
│   to M groups of cell control parameters CPs of the target cell, where the │
│     network status parameters include a cell statistics key performance    │
│    parameter KPI and a cell measurement parameter, the KPI is used to      │── S110
│   indicate running performance of a cell, the cell measurement parameter   │
│   is used to indicate service distribution of a cell or a resource usage status │
│    of a cell, the CP is used to indicate base station setting of a cell, the M │
│    groups of network status parameters are respectively acquired by means  │
│    of M times of sampling, the M groups of CPs are respectively acquired   │
│     by means of M times of sampling, and the M groups of CPs and the M     │
│     groups of network status parameters are in a one-to-one correspondence │
└─────────────────────────────────────────────────────────────┘
                                  ▼
┌─────────────────────────────────────────────────────────────┐
│    Determine, according to the first network status parameter and from     │
│  a first entry that records a mapping relationship between a network status│── S120
│    parameter and a security status, a security status of the target cell in the │
│                             first time segment                             │
└─────────────────────────────────────────────────────────────┘
                                  ▼
┌─────────────────────────────────────────────────────────────┐
│ Perform network optimization on the target cell according to the security  │── S130
│          status of the target cell in the first time segment               │
└─────────────────────────────────────────────────────────────┘
```

FIG. 1

NETWORK OPTIMIZATION METHOD, AND
NETWORK OPTIMIZATION DEVICE

CROSS-REFERENCE TO RELATED
APPLICATIONS

This application is a continuation of International Patent Application No. PCT/CN2013/075055, filed on May 2, 2013, which is hereby incorporated by reference in its entirety.

TECHNICAL FIELD

The present disclosure relates to the communications field, and in particular, to a network optimization method, a network optimization apparatus, and a network optimization device.

BACKGROUND

As data rate requirements of users continuously increase, and the base station miniaturization trend becomes increasingly obvious, a quantity of network elements that need to be maintained by an operator is growing rapidly, and maintenance costs that need to be invested are also increasing. In addition, due to high mobility of user applications, a mobile communications network is increasingly dynamic. A Self-Organization Network (SON) technology is proposed, expecting to achieve maximal automation in planning, deployment, and operation and maintenance phases of the mobile communications network, so as to achieve objectives of reducing operating costs and improving key performance indicator (KPI) of the network.

Application of the SON technology is based on identifying of a network status, that is, a network node first needs to learn a current running status of a network, so as to provide necessary information for the SON technology, for example, which SON operations are triggered. Therefore, how to obtain, by analyzing, the current running status of the network is a prerequisite for SON application.

In an existing SON-based cellular network, an operator learns a current running status of the network through KPI statistics of a network management system. When a KPI statistics value of the network exceeds a range preset by the operator, that is, when network performance cannot reach a preset value, operation and maintenance and network management personnel learn, by using an empirical analysis method, a problem that may occur during network running, that is, which network parameters are improperly configured, so as to trigger a corresponding optimization algorithm. After parameter configuration output by the optimization algorithm is applied on a network device, network KPI statistics are continuously collected and reported to the network management system. Operations of KPI statistics reporting, performance alarming, fault analysis, parameter configuration, and KPI running and statistics collection continuously cycle, so as to implement maintenance of the cellular network.

However, representing a current running status of a network only by using a KPI cannot reflect a problem with the network, and manual analysis is required. Therefore, a huge investment of human resources costs and expert knowledge are required. In addition, an optimization algorithm that is triggered only by KPIs cannot ensure that a corresponding effect is achieved.

SUMMARY

Embodiments of the present disclosure provide a network optimization method, a network optimization apparatus, and a network optimization device, which can reduce costs of network optimization and improve the network optimization effect.

According to a first aspect, a network optimization method is provided, where the method includes: acquiring, in a first time segment, a first network status parameter that is determined according to M groups of network status parameters of at least one target cell, and acquiring a first CP that is determined according to M groups of cell control parameters CPs of the target cell, where the network status parameters include a cell statistics key performance parameter KPI and a cell measurement parameter, the KPI is used to indicate running performance of a cell, the cell measurement parameter is used to indicate service distribution of a cell and/or a resource usage status of a cell, the CP is used to indicate base station setting of a cell, the M groups of network status parameters are respectively acquired by means of M times of sampling, the M groups of CPs are respectively acquired by means of M times of sampling, and the M groups of CPs and the M groups of network status parameters are in a one-to-one correspondence; determining, according to the first network status parameter and from a first entry that records a mapping relationship between a network status parameter and a security status, a security status of each target cell in the first time segment; and performing network optimization on the target cell according to the security status of the target cell in the first time segment.

With reference to the first aspect, in a first implementation manner of the first aspect, the acquiring a first network status parameter that is determined according to M groups of network status parameters of at least one target cell includes: acquiring the M groups of network status parameters from the target cell; and acquiring the first network status parameter by performing statistics collection and averaging processing on the M groups of network status parameters; and the acquiring a first CP that is determined according to M groups of cell control parameters CP of the target cell includes: acquiring the M groups of CPs from the target cell; and acquiring the first CP by performing statistics collection and averaging processing on the M groups of CPs.

With reference to the first aspect and the foregoing implementation manner of the first aspect, in a second implementation manner of the first aspect, the acquiring a first network status parameter that is determined according to M groups of network status parameters of at least one target cell includes: acquiring the first network status parameter from the target cell, where the first network status parameter is obtained after statistics collection and averaging processing are performed on the M groups of network status parameters in the target cell; and the acquiring a first CP that is determined according to M groups of cell control parameters CPs of the target cell includes: acquiring the first CP from the target cell, where the first CP is obtained after statistics collection and averaging processing are performed on the M groups of CPs in the target cell.

With reference to the first aspect and the foregoing implementation manners of the first aspect, in a third implementation manner of the first aspect, the performing network optimization on the target cell according to the security status of the target cell in the first time segment includes: if the security status of the target cell in the first time segment is secure, recording a mapping relationship between the first network status parameter and the first CP.

With reference to the first aspect and the foregoing implementation manners of the first aspect, in a fourth implementation manner of the first aspect, the performing network optimization on the target cell according to the security status of the target cell in the first time segment includes: if the security status of the target cell in the first time segment is insecure, determining, from network status parameters recorded in a second time segment, a second network status parameter that has a highest cell measurement parameter similarity with the first network status parameter, where the second time segment is earlier than the first time segment, and a security status of the target cell in the second time segment is secure; determining a first adjustment policy for the first CP according to a second CP corresponding to the second network status parameter; determining, according to the first network status parameter, a second adjustment policy for the first CP from a second entry that records a mapping relationship between a network status parameter and a CP adjustment policy; and performing network optimization on the target cell according to the first adjustment policy and the second adjustment policy.

With reference to the first aspect and the foregoing implementation manners of the first aspect, in a fifth implementation manner of the first aspect, the determining, according to the first network status parameter, a second adjustment policy for the first CP from a second entry that records a mapping relationship between a network status parameter and a CP adjustment policy includes: determining the second adjustment policy from the second entry according to the first network status parameter and the first adjustment policy.

With reference to the first aspect and the foregoing implementation manners of the first aspect, in a sixth implementation manner of the first aspect, the KPI includes at least one dimension of parameter in the following parameters: a throughput of a cell, a call loss rate of a cell, a call drop rate of a cell, and a handover performance parameter of a cell; the cell measurement parameter includes at least one dimension of parameter in the following parameters: a quantity of users of a cell, load of a cell, and interference of a cell; and the CP includes at least one dimension of parameter in the following parameters: transmit power of a base station, an antenna downtilt of a base station, and a handover parameter of a cell.

With reference to the first aspect and the foregoing implementation manners of the first aspect, in a seventh implementation manner of the first aspect, the KPI includes at least two dimensions of parameters in the following parameters: a throughput of a cell, a call loss rate of a cell, a call drop rate of a cell, and a handover performance parameter of a cell; and/or the cell measurement parameter includes at least two dimensions of parameters in the following parameters: a quantity of users of a cell, load of a cell, and interference of a cell.

With reference to the first aspect and the foregoing implementation manners of the first aspect, in an eighth implementation manner of the first aspect, before the determining, according to the first network status parameter and from a first entry that records a mapping relationship between a network status parameter and a security status, a security status of each target cell in the first time segment, the method further includes: performing first dimension reduction processing on the first network status parameter according to a mutual effect relationship between a KPI included in the first network status parameter and the first CP, and/or a mutual effect relationship between a cell measurement parameter included in the first network status parameter and the first CP.

With reference to the first aspect and the foregoing implementation manners of the first aspect, in a ninth implementation manner of the first aspect, before the determining, according to the first network status parameter and from a first entry that records a mapping relationship between a network status parameter and a security status, a security status of each target cell in the first time segment, the method further includes: performing second dimension reduction processing on the first network status parameter according to a correlation between the KPI included in the first network status parameter and a cell measurement parameter included in the first network status parameter.

With reference to the first aspect and the foregoing implementation manners of the first aspect, in a tenth implementation manner of the first aspect, the determining, according to the first network status parameter and from a first entry that records a mapping relationship between a network status parameter and a security status, a security status of each target cell in the first time segment includes: performing clustering processing on the first network status parameter and a network status parameter that is acquired in a third time segment, so as to minimize a feature space distance between a member network status parameter and a central network status parameter that are in each generated cluster, where the third time segment is earlier than the first time segment; determining a third network status parameter according to the first network status parameter, where the third network status parameter is a central network status parameter in a cluster to which the first network status parameter belongs; and determining, according to the third network status parameter and from the first entry, the security status of the target cell in the first time segment.

With reference to the first aspect and the foregoing implementation manners of the first aspect, in an eleventh implementation manner of the first aspect, the performing network optimization on the target cell according to the security status of the target cell in the first time segment includes: if the security status of the target cell in the first time segment is insecure, determining, from the network status parameters recorded in the second time segment, the second network status parameter that has the highest cell measurement parameter similarity with the first network status parameter, where the second time segment is earlier than the first time segment, and the security status of the target cell in the second time segment is secure; determining the first adjustment policy for the first CP according to the second CP corresponding to the second network status parameter; determining, according to the third network status parameter, a third adjustment policy for the first CP from the second entry that records the mapping relationship between a network status parameter and a CP adjustment policy; and performing network optimization on the target cell according to the first adjustment policy and the third adjustment policy.

With reference to the first aspect and the foregoing implementation manners of the first aspect, in a twelfth implementation manner of the first aspect, the determining, according to the third network status parameter, a third adjustment policy for the first CP from the second entry that records the mapping relationship between a network status parameter and a CP adjustment policy includes: determining the third adjustment policy from the second entry according to the third network status parameter and the first adjustment policy.

According to a second aspect, a network optimization apparatus is provided. The apparatus includes: an acquiring unit, configured to: acquire, in a first time segment, a first network status parameter that is determined according to M groups of network status parameters of at least one target cell, and acquire a first CP that is determined according to M groups of cell control parameters CPs of the target cell, where the network status parameters include a cell statistics key performance parameter KPI and a cell measurement parameter, the KPI is used to indicate running performance of a cell, the cell measurement parameter is used to indicate service distribution of a cell and/or a resource usage status of a cell, the CP is used to indicate base station setting of a cell, the M groups of network status parameters are respectively acquired by means of M times of sampling, the M groups of CPs are respectively acquired by means of M times of sampling, and the M groups of CPs and the M groups of network status parameters are in a one-to-one correspondence; and a processing unit, configured to: determine, according to the first network status parameter and from a first entry that records a mapping relationship between a network status parameter and a security status, a security status of each target cell in the first time segment; and perform network optimization on the target cell according to the security status of the target cell in the first time segment.

With reference to the second aspect, in a first implementation manner of the second aspect, the acquiring unit is specifically configured to: acquire the M groups of network status parameters from the target cell; acquire the first network status parameter by performing statistics collection and averaging processing on the M groups of network status parameters; acquire the M groups of CPs from the target cell; and acquire the first CP by performing statistics collection and averaging processing on the M groups of CPs.

With reference to the second aspect and the foregoing implementation manner of the second aspect, in a second implementation manner of the second aspect, the acquiring unit is specifically configured to: acquire the first network status parameter from the target cell, where the first network status parameter is obtained after statistics collection and averaging processing are performed on the M groups of network status parameters in the target cell; and acquire the first CP from the target cell, where the first CP is obtained after statistics collection and averaging processing are performed on the M groups of CPs in the target cell.

With reference to the second aspect and the foregoing implementation manners of the second aspect, in a third implementation manner of the second aspect, the processing unit is specifically configured to: if the security status of the target cell in the first time segment is secure, record a mapping relationship between the first network status parameter and the first CP.

With reference to the second aspect and the foregoing implementation manners of the second aspect, in a fourth implementation manner of the second aspect, the processing unit is specifically configured to: if the security status of the target cell in the first time segment is insecure, determine, from network status parameters recorded in a second time segment, a second network status parameter that has a highest cell measurement parameter similarity with the first network status parameter, where the second time segment is earlier than the first time segment, and a security status of the target cell in the second time segment is secure; determine a first adjustment policy for the first CP according to a second CP corresponding to the second network status parameter; determine, according to the first network status parameter, a second adjustment policy for the first CP from a second entry that records a mapping relationship between a network status parameter and a CP adjustment policy; and perform network optimization on the target cell according to the first adjustment policy and the second adjustment policy.

With reference to the second aspect and the foregoing implementation manners of the second aspect, in a fifth implementation manner of the second aspect, the processing unit is specifically configured to determine the second adjustment policy from the second entry according to the first network status parameter and the first adjustment policy.

With reference to the second aspect and the foregoing implementation manners of the second aspect, in a sixth implementation manner of the second aspect, the KPI includes at least one dimension of parameter in the following parameters: a throughput of a cell, a call loss rate of a cell, a call drop rate of a cell, and a handover performance parameter of a cell; the cell measurement parameter includes at least one dimension of parameter in the following parameters: a quantity of users of a cell, load of a cell, and interference of a cell; and the CP includes at least one dimension of parameter in the following parameters: transmit power of a base station, an antenna downtilt of a base station, and a handover parameter of a cell.

With reference to the second aspect and the foregoing implementation manners of the second aspect, in an seventh implementation manner of the second aspect, the KPI includes at least two dimensions of parameters in the following parameters: a throughput of a cell, a call loss rate of a cell, a call drop rate of a cell, and a handover performance parameter of a cell; and/or the cell measurement parameter includes at least two dimensions of parameters in the following parameters: a quantity of users of a cell, load of a cell, and interference of a cell.

With reference to the second aspect and the foregoing implementation manners of the second aspect, in an eighth implementation manner of the second aspect, the processing unit is further configured to perform first dimension reduction processing on the first network status parameter according to a mutual effect relationship between a KPI included in the first network status parameter and the first CP, and/or a mutual effect relationship between a cell measurement parameter included in the first network status parameter and the first CP.

With reference to the second aspect and the foregoing implementation manners of the second aspect, in a ninth implementation manner of the second aspect, the processing unit is further configured to perform second dimension reduction processing on the first network status parameter according to a correlation between the KPI included in the first network status parameter and a cell measurement parameter included in the first network status parameter.

With reference to the second aspect and the foregoing implementation manners of the second aspect, in a tenth implementation manner of the second aspect, the processing unit is further configured to: perform clustering processing on the first network status parameter and a network status parameter that is acquired in a third time segment, so as to minimize a feature space distance between a member network status parameter and a central network status parameter that are in each generated cluster, where the third time segment is earlier than the first time segment; determine a third network status parameter according to the first network status parameter, where the third network status parameter is a central network status parameter in a cluster to which the first network status parameter belongs; and determine, according to the third network status parameter and from the first entry, the security status of the target cell in the first time segment.

With reference to the second aspect and the foregoing implementation manners of the second aspect, in an eleventh implementation manner of the second aspect, the processing unit is specifically configured to: if the security status of the target cell in the first time segment is insecure, determine, from the network status parameters recorded in the second time segment, the second network status parameter that has the highest cell measurement parameter similarity with the first network status parameter, where the second time segment is earlier than the first time segment, and the security status of the target cell in the second time segment is secure; determine the first adjustment policy for the first CP according to the second CP corresponding to the second network status parameter; determine, according to the third network status parameter, a third adjustment policy for the first CP from the second entry that records the mapping relationship between a network status parameter and a CP adjustment policy; and perform network optimization on the target cell according to the first adjustment policy and the third adjustment policy.

With reference to the second aspect and the foregoing implementation manners of the second aspect, in a twelfth implementation manner of the second aspect, the processing unit is further configured to determine the third adjustment policy from the second entry according to the third network status parameter and the first adjustment policy.

According to a third aspect, a network optimization device is provided. The device includes: a bus, a processor connected to the bus, and a memory connected to the bus, where: the processor invokes, by using the bus, a program stored in the memory, so as to: acquire, in a first time segment, a first network status parameter that is determined according to M groups of network status parameters of at least one target cell, and acquire a first CP that is determined according to M groups of cell control parameters CPs of the target cell, where the network status parameters include a cell statistics key performance parameter KPI and a cell measurement parameter, the KPI is used to indicate running performance of a cell, the cell measurement parameter is used to indicate service distribution of a cell and/or a resource usage status of a cell, the CP is used to indicate base station setting of a cell, the M groups of network status parameters are respectively acquired by means of M times of sampling, the M groups of CPs are respectively acquired by means of M times of sampling, and the M groups of CPs and the M groups of network status parameters are in a one-to-one correspondence; determine, according to the first network status parameter and from a first entry that records a mapping relationship between a network status parameter and a security status, a security status of each target cell in the first time segment; and perform network optimization on the target cell according to the security status of the target cell in the first time segment.

With reference to the third aspect, in a first implementation manner of the third aspect, the processor is specifically configured to: acquire the M groups of network status parameters from the target cell; acquire the first network status parameter by performing statistics collection and averaging processing on the M groups of network status parameters; acquire the M groups of CPs from the target cell; and acquire the first CP by performing statistics collection and averaging processing on the M groups of CPs.

With reference to the third aspect and the foregoing implementation manner of the third aspect, in a second implementation manner of the third aspect, the processor is specifically configured to: acquire the first network status parameter from the target cell, where the first network status parameter is obtained after statistics collection and averaging processing are performed on the M groups of network status parameters in the target cell; and acquire the first CP from the target cell, where the first CP is obtained after statistics collection and averaging processing are performed on the M groups of CPs in the target cell.

With reference to the third aspect and the foregoing implementation manners of the third aspect, in a third implementation manner of the third aspect, the processor is specifically configured to: if the security status of the target cell in the first time segment is secure, record a mapping relationship between the first network status parameter and the first CP.

With reference to the third aspect and the foregoing implementation manners of the third aspect, in a fourth implementation manner of the third aspect, the processor is specifically configured to: if the security status of the target cell in the first time segment is insecure, determine, from network status parameters recorded in a second time segment, a second network status parameter that has a highest cell measurement parameter similarity with the first network status parameter, where the second time segment is earlier than the first time segment, and a security status of the target cell in the second time segment is secure; determine a first adjustment policy for the first CP according to a second CP corresponding to the second network status parameter; determine, according to the first network status parameter, a second adjustment policy for the first CP from a second entry that records a mapping relationship between a network status parameter and a CP adjustment policy; and perform network optimization on the target cell according to the first adjustment policy and the second adjustment policy.

With reference to the third aspect and the foregoing implementation manners of the third aspect, in a fifth implementation manner of the third aspect, the processor is specifically configured to determine the second adjustment policy from the second entry according to the first network status parameter and the first adjustment policy.

With reference to the third aspect and the foregoing implementation manners of the third aspect, in a sixth implementation manner of the third aspect, the KPI includes at least one dimension of parameter in the following parameters: a throughput of a cell, a call loss rate of a cell, a call drop rate of a cell, and a handover performance parameter of a cell; the cell measurement parameter includes at least one dimension of parameter in the following parameters: a quantity of users of a cell, load of a cell, and interference of a cell; and the CP includes at least one dimension of parameter in the following parameters: transmit power of a base station, an antenna downtilt of a base station, and a handover parameter of a cell.

With reference to the third aspect and the foregoing implementation manners of the third aspect, in an seventh implementation manner of the third aspect, the KPI includes at least two dimensions of parameters in the following parameters: a throughput of a cell, a call loss rate of a cell, a call drop rate of a cell, and a handover performance parameter of a cell; and/or the cell measurement parameter includes at least two dimensions of parameters in the following parameters: a quantity of users of a cell, load of a cell, and interference of a cell.

With reference to the third aspect and the foregoing implementation manners of the third aspect, in an eighth implementation manner of the third aspect, the processor is further configured to perform first dimension reduction processing on the first network status parameter according to a mutual effect relationship between a KPI included in the first network status parameter and the first CP, and/or a mutual effect relationship between a cell measurement parameter included in the first network status parameter and the first CP.

With reference to the third aspect and the foregoing implementation manners of the third aspect, in a ninth implementation manner of the third aspect, the processor is further configured to perform second dimension reduction processing on the first network status parameter according to a correlation between the KPI included in the first network status parameter and a cell measurement parameter included in the first network status parameter.

With reference to the third aspect and the foregoing implementation manners of the third aspect, in a tenth implementation manner of the third aspect, the processor is further configured to: perform clustering processing on the first network status parameter and a network status parameter that is acquired in a third time segment, so as to minimize a feature space distance between a member network status parameter and a central network status parameter that are in each generated cluster, where the third time segment is earlier than the first time segment; determine a third network status parameter according to the first network status parameter, where the third network status parameter is a central network status parameter in a cluster to which the first network status parameter belongs; and determine, according to the third network status parameter and from the first entry, the security status of the target cell in the first time segment.

With reference to the third aspect and the foregoing implementation manners of the third aspect, in an eleventh implementation manner of the third aspect, the processor is specifically configured to: if the security status of the target cell in the first time segment is insecure, determine, from the network status parameters recorded in the second time segment, the second network status parameter that has the highest cell measurement parameter similarity with the first network status parameter, where the second time segment is earlier than the first time segment, and the security status of the target cell in the second time segment is secure; determine the first adjustment policy for the first CP according to the second CP corresponding to the second network status parameter; determine, according to the third network status parameter, a third adjustment policy for the first CP from the second entry that records the mapping relationship between a network status parameter and a CP adjustment policy; and perform network optimization on the target cell according to the first adjustment policy and the third adjustment policy.

With reference to the third aspect and the foregoing implementation manners of the third aspect, in a twelfth implementation manner of the third aspect, the processor is further configured to determine the third adjustment policy from the second entry according to the third network status parameter and the first adjustment policy.

According to the network optimization method, the network optimization apparatus, and the network optimization device in the embodiments of the present disclosure, a current running status of a network is represented by using a KPI that is used to indicate running performance of a cell, and a cell measurement parameter that is used to indicate service distribution of a cell and/or a resource usage status of a cell, and network optimization is performed, which can accurately represent the current running status of the network, reliably reflect a problem with the network, and therefore can reduce human resource costs, improve accuracy in triggering an optimization algorithm, and improve a network optimization effect.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a schematic flowchart of a network optimization method according to an embodiment of the present disclosure;

DESCRIPTION OF EMBODIMENTS

Figure 2:
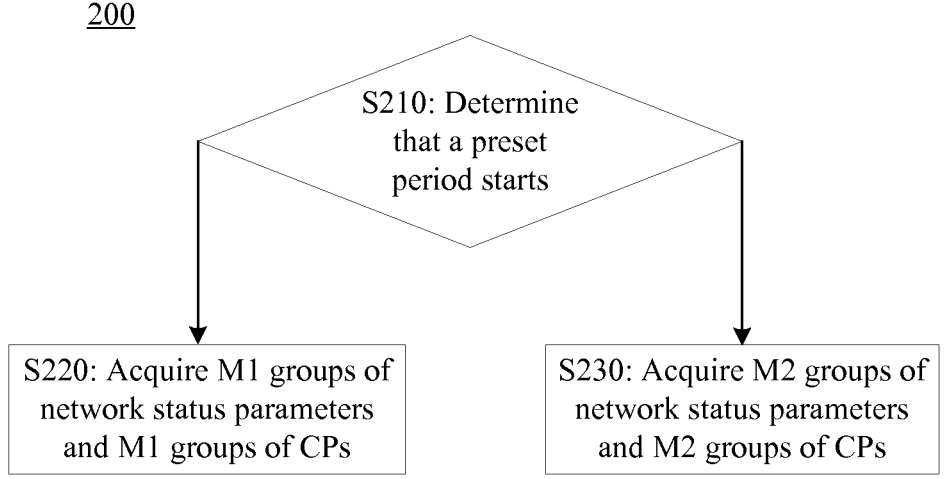
FIG. 2 is a schematic flowchart of a method for acquiring a sampled value of a network status parameter according to an embodiment of the present disclosure.

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems, such as: a Global System for Mobile Communications (GSM), a Code Division Multiple Access (CDMA) system, a Wideband Code Division Multiple Access (WCDMA), a general packet radio service (GPRS), and Long Term Evolution (LTE).

User equipment (UE), also referred to as a mobile terminal, mobile user equipment, and the like, may communicate with one or more core networks through a radio access network (RAN). The user equipment may be a mobile terminal, such as a mobile phone (or referred to as a "cellular" phone) and a computer with a mobile terminal. For example, the user equipment may be a portable, pocket-sized, handheld, computer built-in, or in-vehicle mobile apparatus, which exchanges voice and/or data with the radio access network.

A base station may be a base transceiver station (BTS) in GSM or CDMA, or may be a NodeB in WCDMA, or may be an evolved NodeB (eNB or e-NodeB) in LTE, which is not limited in the present disclosure. However, for ease of description, the following embodiments are described by using a NodeB as an example.

FIG. 1 is a schematic flowchart of a network optimization method 100 according to an embodiment of the present disclosure. As shown in FIG. 1, the method 100 includes:

S110: Acquire, in a first time segment, a first network status parameter that is determined according to M groups of network status parameters of at least one target cell, and acquire a first CP that is determined according to M groups of cell control parameters CPs of the target cell, where the network status parameters include a cell statistics key performance parameter KPI and a cell measurement parameter, the KPI is used to indicate running performance of a cell, the cell measurement parameter is used to indicate service distribution of a cell and/or a resource usage status of a cell, the CP is used to indicate base station setting of a cell, the M groups of network status parameters are respectively acquired by means of M times of sampling, the M groups of CPs are respectively acquired by means of M times of sampling, and the M groups of CPs and the M groups of network status parameters are in a one-to-one correspondence.

S120: Determine, according to the first network status parameter and from a first entry that records a mapping relationship between a network status parameter and a security status, a security status of each target cell in the first time segment.

S130: Perform network optimization on the target cell according to the security status of the target cell in the first time segment.

In this embodiment of the present disclosure, the method 100 may be executed by a base station device (specifically, a SON entity configured in the base station device) of the target cell, or may be executed by another network device that communicates with and is connected to a base station device of the target cell, for example, an eCoordinator, or may be completed by a base station device and an eCoordinator collaboratively, which is not specially limited in the present disclosure. For ease of understanding, unless otherwise specified, the following describes a specific process of the method 100 by using an eCoordinator as an entity for executing the method 100.

In this embodiment of the present disclosure, the eCoordinator may communicate with and be connected to one base station device, and therefore, when the base station device provides one or more cells, the eCoordinator may perform network optimization on a network that is constituted by one cell of the base station device, or may perform optimization on a network that is constituted by multiple cells of the base station device; or the eCoordinator may also communicate with and be connected to multiple base station devices, so that the eCoordinator can perform network optimization on a network that is constituted by multiple cells of the multiple base station devices.

In this embodiment of the present disclosure, the method 100 may be executed within a preset period or when a preset event is met (an example of the first time segment), where the preset period, for example, may be set according to a policy of an operator, and the preset event, for example, may also be set according to a policy of an operator, and may be related to a KPI alarm. It should be understood that the foregoing enumerated methods for setting the preset period and the preset event are merely exemplary descriptions, and the present disclosure is not limited thereto. Another method that can trigger executing of the method 100 shall fall within the protection scope of the present disclosure.

Specifically, in S110, in the first time segment (for example, within the preset period or when the preset event is met), the eCoordinator may acquire, from (one or more) base station devices of (one or more) target cells, a network status parameter (the first network status parameter) that is used to determine a network status (or referred to as a security status) of a network (constituted by one or more cells) in the first time segment. In this embodiment of the present disclosure, the first network status parameter is determined according to multiple groups (M groups; in this embodiment of the present disclosure, M may be a positive integer) of sampled data measured by a base station device and/or user equipment in the first time segment. In this determining method, for example, statistics collection and averaging processing may be performed on the M groups of sampled data. A method for and a process of performing statistics collection and averaging processing may be similar to those in the prior art. Herein, to avoid repetition, descriptions of the method and the process are omitted. In addition, the foregoing procedure of acquiring the first network status parameter according to the M groups of sampled data may be executed by the eCoordinator, or may be executed by the base station device, which is not specially limited in the present disclosure. For ease of understanding and description, the following describes, by using a base station device as an execution body, the procedure of acquiring the first network status parameter according to the M groups of sampled data.

FIG. 2 is a schematic flowchart of a method 200 for acquiring a sampled value of a network status parameter according to an embodiment of the present disclosure.

As shown in FIG. 2, in S210, a base station device may determine, by using a time measurement device such as a timer, entering of a preset period (an example of a first time segment), so as to trigger a subsequent procedure. In this embodiment of the present disclosure, a length of the period, for example, may be selected according to a policy of an operator.

Optionally, in this embodiment of the present disclosure, the KPI includes at least one dimension of parameter in the following parameters: a throughput of a cell, a call loss rate of a cell, a call drop rate of a cell, and a handover performance parameter of a cell.

The cell measurement parameter includes at least one dimension of parameter in the following parameters: a quantity of users of a cell, load of a cell, and interference of a cell.

The CP includes at least one dimension of parameter in the following parameters: transmit power of a base station, an antenna downtilt of a base station, and a handover parameter of a cell.

Specifically, in this embodiment of the present disclosure, the network status parameters include the KPI and the cell measurement parameter. The KPI is used to indicate running performance of a cell, and may include parameters such as a throughput, a call loss rate, a call drop rate, and handover performance.

The cell measurement parameter is used to indicate a current service distribution and resource usage status of a cell, and may include parameters such as a quantity of users of a cell, load of a cell, and interference of a cell, where the interference of a cell may be obtained according to feedback from user equipment.

The CP refers to a configuration parameter that is of a cell and that is broadcast by the base station device to the user equipment, and may include a resource configuration parameter (for example, transmit power) of the base station device, an antenna configuration parameter (for example, an antenna downtilt) of the base station device, a handover parameter of a cell, and the like.

In S220, the base station device may acquire, in the preset period, M1 (in this embodiment of the present disclosure, M1 may be a positive integer) groups of network status parameters and M1 groups of CPs. In this embodiment of the present disclosure, a specific value of M1, for example, may be selected according to a policy of an operator. In addition, in this embodiment of the present disclosure, to improve an effect of network optimization, when a group of network status parameters is acquired, CPs at this moment also need to be acquired, that is, the M1 groups of network status parameters and the M1 groups of CPs are in a one-to-one correspondence.

In S230, in the preset period (an example of the first time segment), after determining that a preset event is met, the base station device may acquire M2 (in this embodiment of the present disclosure, M2 may be a positive integer) groups of network status parameters. For example, after receiving a KPI alarm, the base station device may immediately acquire a group of network status parameters and a group of CPs; in addition, for example, if a KPI value in the group of network status parameters exceeds a preset threshold $M_{Thr}$, the base station device may continue to acquire a group of network status parameters and a group of CPs, and so on, until an acquired KPI is less than $KPI_{Thr}$, so that the base station device can continuously acquire M2 groups of network status parameters and M2 groups of CPs. In this case, if M2 is greater than the preset threshold $M_{Thr}$ the M2 groups of network status parameters and the M2 groups of CPs may be saved. $KPI_{Thr}$ and $M_{Thr}$ may be selected according to a policy of an operator. In addition, in this embodiment of the present disclosure, to improve an effect of network optimization, when a group of network status parameters is acquired, CPs at this moment also need to be acquired, that is, the M2 groups of network status parameters and the M2 groups of CPs are in a one-to-one correspondence.

Therefore, the M1 groups of network status parameters and the M2 groups of network status parameters constitute the M groups of network status parameters in this embodiment of the present disclosure; the M1 groups of CPs and the M2 groups of CPs constitute the M groups of CPs in this embodiment of the present disclosure.

It should be noted herein that, to ensure an effect and accuracy of network optimization, dimensions (or referred to as types) of parameters included in the M groups of network status parameters need to be consistent, and dimensions of parameters (or referred to as types) included in the M groups of CPs need to be consistent. For example, if a KPI in a first group of network status parameters includes a throughput, a call loss rate, a call drop rate, and handover performance, a KPI in each group of subsequently acquired network status parameters also needs to include a throughput, a call loss rate, a call drop rate, and handover performance.

It should be understood that the foregoing enumerated method for acquiring a sampled value of a network status parameter is merely an exemplary description, and the present disclosure is not limited thereto. For example, it is acceptable that only S210 and S220 in the method are executed, and in this case, M=M1; or it is acceptable that only S210 and S230 in the method are executed, and in this case, M=M2.

It should be understood that, when there is one target cell, the M groups of network status parameters and the M groups of CPs come from one base station device that provides the target cell; when there are multiple target cells, the M groups of network status parameters and the M groups of CPs come from one or more base station devices that provide the target cells.

Optionally, in this embodiment of the present disclosure, the acquiring a first network status parameter that is determined according to M groups of network status parameters of at least one target cell includes:

acquiring the M groups of network status parameters from the target cell; and acquiring the first network status parameter by performing statistics collection and averaging processing on the M groups of network status parameters.

The acquiring a first CP that is determined according to M groups of cell control parameters CPs of the target cell includes:

acquiring the M groups of CPs from the target cell; and acquiring the first CP by performing statistics collection and averaging processing on the M groups of CPs.

Specifically, after acquiring the M groups of network status parameters and the M groups of CPs, the base station device may transmit the M groups of network status parameters and the M groups of CPs to the eCoordinator, so that the eCoordinator, for example, may separately perform statistics collection and averaging processing on the M groups of network status parameters (including M groups of KPIs and M groups of cell measurement parameters) and the M groups of CPs, so as to obtain a group of data that can represent a network status of the target cell in this sampling period, that is, the first network status parameter and the first CP. In this embodiment of the present disclosure, the foregoing method for and process of performing statistics collection and averaging processing may be similar to those in the prior art. Herein, to avoid repetition, descriptions of the method and the process are omitted.

It should be understood that the foregoing enumerated methods for obtaining the first network status parameter according to the M groups of network status parameters and obtaining the first CP according to the M groups of CPs are merely exemplary descriptions, and the present disclosure is not limited thereto. Another method that can be used to determine the network status of the target cell in this sampling period according to the M groups of network status parameters and the M groups of CPs shall fall within the protection scope of the present disclosure.

In this way, the eCoordinator processes the M groups of network status parameters and the M groups of CPs, so that burden on the base station device can be reduced; in addition, when network optimization is performed on multiple target cells and M groups of network status parameters and M groups of CPs that come from multiple base station devices are required to acquire the first network status parameter and the first CP, the eCoordinator processes the M groups of network status parameters and the M groups of CPs, so that a current status of a network that is constituted by the multiple target cells can further be accurately reflected, thereby further improving an effect of network optimization in this embodiment of the present disclosure.

Optionally, the acquiring a first network status parameter that is determined according to M groups of network status parameters of at least one target cell includes:

acquiring the first network status parameter from the target cell, where the first network status parameter is obtained after statistics collection and averaging processing are performed on the M groups of network status parameters in the target cell.

The acquiring a first CP that is determined according to M groups of cell control parameters CPs of the target cell includes:

acquiring the first CP from the target cell, where the first CP is obtained after statistics collection and averaging processing are performed on the M groups of CPs in the target cell.

Specifically, after acquiring the M groups of network status parameters and the M groups of CPs, the base station device, for example, may separately perform statistics collection and averaging processing on the M groups of network status parameters (including M groups of KPIs and M groups of cell measurement parameters) and the M groups of CPs, so as to obtain a group of data that can represent a network status of the target cell in this sampling period, that is, the first network status parameter and the first CP. In this embodiment of the present disclosure, the foregoing method for and process of performing statistics collection and averaging processing may be similar to those in the prior art. Herein, to avoid repetition, descriptions of the method and the process are omitted.

It should be understood that the foregoing enumerated methods for obtaining the first network status parameter according to the M groups of network status parameters and obtaining the first CP according to the M groups of CPs are merely exemplary descriptions, and the present disclosure is not limited thereto. Another method that can be used to determine the network status of the target cell in this sampling period according to the M groups of network status parameters and the M groups of CPs shall fall within the protection scope of the present disclosure.

In this way, the base station device processes the M groups of network status parameters and the M groups of CPs, so that burden on the eCoordinator can be reduced, and a case in which transmission resources are occupied because a large amount of data is transmitted between the base station device and the eCoordinator can be avoided.

In S120, the eCoordinator may acquire in advance a use case entry (the first entry) that records the network status parameter and the security status (or referred to as a network status). The following Table 1 shows an example of the Use Case entry in this embodiment of the present disclosure.

status parameters) of network status parameters (including a KPI and a cell measurement parameter). Network status parameters in a same cluster are corresponding to a same security status (or referred to as a Use Case). For example, Cluster 1 may include multiple network status parameters, and a security status of a cell in the case of each network status parameter in Cluster 1 (or referred to as a Use Case corresponding to each network status parameter in Cluster 1) is secure.

In this embodiment of the present disclosure, the Use Case entry may be acquired from an expert system, or may be constructed based on a success case of network optimization. For example, a new network problem occurs in a running process of a network; the problem is resolved by locating and analyzing the problem and then taking a specific optimization action and generating corresponding network configuration. This is a success case of network optimization. As a record of the use case entry, the success case includes a network status parameter, a Use Case (which can be used to determine a security status), and an adjustment policy (the second column in Table 1, which is described in detail subsequently) that are corresponding to the network problem.

It should be noted herein that, in this embodiment of the present disclosure, a dimension of a network status parameter (or referred to as a type of a specific parameter included) recorded in the Use Case entry may be consistent or inconsistent with a dimension of the first network status parameter, which is not specially limited in the present disclosure.

In this embodiment of the present disclosure, the fourth column in Table 1 may indicate an algorithm used for network optimization.

TABLE 1

| Network status parameter | CP adjustment policy | Use case | Algorithm |
|---|---|---|---|
| Cluster (Cluster) 1 | No action (NA) | Secure | No action |
| Cluster 2 | Down tilt Power power | Coverage and capacity optimization CCO | CCO |
| Cluster 2 | Reference signal received power threshold RSRP threshold Frequency ratio Frequency ratio | CCO | Inter-cell interference coordination ICIC |
| Cluster 2 | Frequency Frequency | CCO | Dynamic spectrum management DSM |
| Cluster 3 | Hysteresis Hysteresis Time to trigger Time To Trig | Mobility robustness optimization MRO | MRO |
| Cluster 4 | Offset Offset | Mobility load balancing MLB | LB |
| Cluster 5 | Hysteresis Hysteresis Time to trigger Time To Trig Offset Offset | MRO, MLB | Joint Joint |
| Cluster 6 | Down tilt Power power Offset Offset | CCO, MLB | Joint Joint |
| Cluster 7 | Handover HO New traffic threshold New traffic threshold Traffic congestion threshold Traffic congestion threshold | Access control AC | AC |

As shown in Table 1, the third column indicates Use Cases, and the Use Cases indicated by the third column may be classified into two types: secure and insecure. That is, the security status may be determined according to the Use Cases. For example, in Table 1, all use cases except a Use Case corresponding to Cluster 1 are insecure. The first column indicates a cluster (including one or more network It should be understood that the foregoing enumerated Table 1 is merely an exemplary description of the Use Case entry, and the present disclosure is not limited thereto. For example, the Use Case entry may further include only the first column (network status parameter) and the third column (Use Case) of Table 1; or the third column of Table 1 may record a security status, and does not record a Use Case.

Then, the eCoordinator may determine a cluster to which the first network status parameter belongs in the Use Case entry.

For example, the eCoordinator may determine a feature distance between the first network status parameter and a cluster center of each cluster in the Use Case entry, and use a cluster whose feature distance from the first network status parameter is less than a preset clustering threshold as the cluster to which the first network status parameter belongs.

Therefore, the eCoordinator may determine the security status of the target cell in the first time segment (or in the case of the first network status parameter) according to a Use Case that is in the Use Case entry and that is corresponding to the cluster to which the first network status parameter belongs. For example, if the first network status parameter belongs to Cluster 1 in Table 1, it may be determined that a security status corresponding to the first network status parameter (or the security status of the target cell in the first time segment) is secure; otherwise, the security status corresponding to the first network status parameter is insecure.

It should be noted herein that, if the feature distance between the first network status parameter and the cluster center of each cluster in the Use Case entry is greater than the preset clustering threshold, the eCoordinator may determine that the security status corresponding to the first network status parameter (or the security status of the target cell in the first time segment) is insecure.

In S130, the eCoordinator may perform network optimization according to the determined security status of the target cell in the first time segment.

The performing network optimization on the target cell according to the security status of the target cell in the first time segment includes:

if the security status of the target cell in the first time segment is secure, recording a mapping relationship between the first network status parameter and the first CP.

Specifically, in this embodiment of the present disclosure, if the determined security status of the target cell in the first time segment is secure, the eCoordinator may record the first network status and the first CP. Therefore, when network optimization is performed again, for example, when a fourth network status parameter is acquired and network optimization is performed according to the fourth network status parameter, if a security status corresponding to the fourth network status parameter is insecure, an adjustment policy for a fourth CP corresponding to the fourth network status parameter may be determined according to a network status and a CP that are in a secure state that includes the recorded first network status and first CP. The method and process are described in detail subsequently.

Optionally, the performing network optimization on the target cell according to the security status of the target cell in the first time segment includes:

if the security status of the target cell in the first time segment is insecure, determining, from network status parameters recorded in a second time segment, a second network status parameter that has a highest cell measurement parameter similarity with the first network status parameter, where the second time segment is earlier than the first time segment, and a security status of the target cell in the second time segment is secure;

determining a first adjustment policy for the first CP according to a second CP corresponding to the second network status parameter;

determining, according to the first network status parameter, a second adjustment policy for the first CP from a second entry that records a mapping relationship between a network status parameter and a CP adjustment policy; and performing network optimization on the target cell according to the first adjustment policy and the second adjustment policy.

Figure 3:
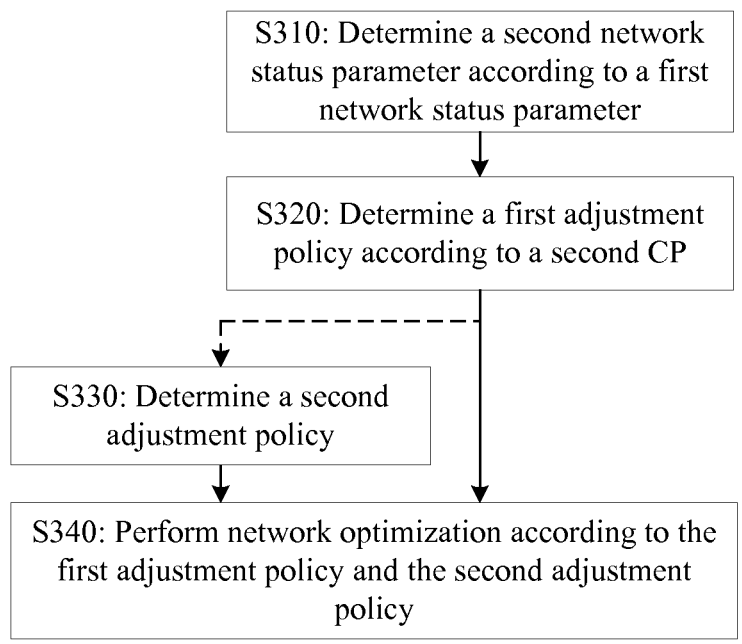
FIG. 3 is a schematic flowchart of a method for performing network optimization according to a network security status according to an embodiment of the present disclosure.

FIG. 3 is a schematic flowchart of a method 300 for performing network optimization in an insecure state.

Similar to the foregoing processing process performed when the security status of the target cell in the first time segment is secure, in one or more time segments (an example of the second time segment) before the first time segment, the eCoordinator may record a network status parameter and a CP that exist when the security status is secure.

Therefore, as shown in FIG. 3, in S310, an eCoordinator may determine, according to the following formula 1 and from network status parameters recorded in the second time segment, a network status parameter (a second network status parameter) that has a highest cell measurement parameter similarity with the first network status parameter, and acquire a second CP corresponding to the second network status parameter. In this embodiment of the present disclosure, "a second CP corresponding to the second network status parameter" means that the second network status parameter and the second CP are acquired and recorded according to K groups of network status parameters and K groups of CPs that are acquired in a same time segment (or referred to as a period).

$$q = arg\ min<E_i, E_{i*}>\qquad \text{Formula 1:}$$

where $E_i$ indicates a cell measurement parameter included in a first network status parameter, and $E_{i*}$ indicates a cell measurement parameter included in a recorded network status parameter of a secure state.

Therefore, in S320, for example, the eCoordinator may determine an adjustment policy (the first adjustment policy) for the first CP according to a relationship between the first CP and the second CP.

Optionally, the determining a first adjustment policy for the first CP according to a second CP corresponding to the second network status parameter includes:

determining that a degree of similarity between a cell measurement parameter included in the first network status parameter and a cell measurement parameter included in the second network status parameter is greater than a preset similarity threshold; and determining the first adjustment policy for the first CP according to the second CP corresponding to the second network status parameter.

Specifically, in this embodiment of the present disclosure, after determining the second network status parameter, the eCoordinator may further determine the degree of similarity between the cell measurement parameter included in the first network status parameter and the cell measurement parameter included in the second network status parameter; if the degree of similarity is greater than the preset similarity threshold, determine the adjustment policy (the first adjustment policy) for the first CP according to the relationship between the first CP and the second CP.

If the degree of similarity does not exceed the preset similarity threshold, the adjustment policy (the first adjustment policy) for the first CP is not output.

In this way, accuracy of the first adjustment policy can be improved, and an effect of network optimization in this embodiment of the present disclosure is further improved.

It should be noted that if the second network status parameter whose degree of similarity exceeds the preset similarity threshold is not found, that is, the first adjustment policy cannot be obtained; network optimization may be performed according to a second adjustment policy described subsequently.

In S330, the eCoordinator may acquire in advance an adjustment policy entry (a second entry) that records a mapping relationship between a network status parameter and a CP adjustment policy (for example, a CP dimension that needs to be adjusted). The foregoing Table 1 shows an example of the adjustment policy entry in this embodiment of the present disclosure.

As shown in Table 1, the second column indicates an adjustment policy (for a CP); the first column indicates a cluster (including one or more network status parameters) of network status parameters (including a KPI and a cell measurement parameter). Network status parameters in a same cluster are corresponding to a same adjustment policy. For example, Cluster 3 may include multiple network status parameters, and an adjustment policy (or referred to as an adjustment policy corresponding to each network status parameter in Cluster 3) of a cell in the case of each network status parameter in Cluster 3 is that hysteresis and time to trigger need to be adjusted.

In this embodiment of the present disclosure, the adjustment policy entry may be acquired from an expert system, or may be constructed based on a success case of network optimization. For example, a new network problem occurs in a running process of a network; the problem is resolved by locating and analyzing the problem and then taking a specific optimization action and generating corresponding network configuration. This is a success case of network optimization. As a record of the adjustment policy entry, the success case includes a network status parameter, a network status, and an adjustment policy that are corresponding to the network problem.

It should be noted herein that, in this embodiment of the present disclosure, a dimension of a network status parameter (or referred to as a type of a specific parameter included) recorded in the adjustment policy entry may be consistent or inconsistent with a dimension of the first network status parameter, which is not specially limited in the present disclosure.

It should be understood that the foregoing enumerated Table 1 is merely an exemplary description of the adjustment policy entry, and the present disclosure is not limited thereto. For example, the adjustment policy entry may further include only the first column (network status parameter) and the second column (CP adjustment policy) of Table 1.

Then, the eCoordinator may determine a cluster to which the first network status parameter belongs in the adjustment policy entry.

For example, the eCoordinator may determine a feature distance between the first network status parameter and a cluster center of each cluster in the adjustment policy entry, and use a cluster whose feature distance from the first network status parameter is less than a preset clustering threshold as the cluster to which the first network status parameter belongs.

In this case, if there is no cluster whose feature distance is less than the clustering threshold, it indicates that the network problem that occurs at a current time is a new problem, and optimization processing may be directly performed according to the first adjustment policy.

Therefore, the eCoordinator may use a CP adjustment policy that is in the adjustment policy entry and that is corresponding to the cluster to which the first network status parameter belongs as the adjustment policy for the first CP (the second adjustment policy).

It should be understood that the foregoing enumerated method for determining the cluster to which the first network status parameter belongs in the adjustment policy entry is merely an exemplary description, and the present disclosure is not limited thereto. For example, a cluster whose feature distance between the first network status parameter and the cluster center of each cluster in the adjustment policy entry is the shortest may also be directly used as the cluster to which the first network status parameter belongs.

Optionally, in this embodiment of the present disclosure, the determining, according to the first network status parameter, a second adjustment policy for the first CP from a second entry that records a mapping relationship between a network status parameter and a CP adjustment policy includes:

determining the second adjustment policy from the second entry according to the first network status parameter and the first adjustment policy.

Specifically, as shown in Table 1, for example, if the cluster to which the first network status parameter belongs is Cluster 2, there are three CP adjustment policies corresponding to Cluster 2. In this case, the adjustment policy for the first CP may be determined, according to the first adjustment policy, from the three CP adjustment policies corresponding to Cluster 2.

It should be understood that the foregoing enumerated method for determining the adjustment policy for the first CP from multiple CP adjustment policies is merely an exemplary description, and the present disclosure is not limited thereto. For example, in this embodiment of the present disclosure, the second adjustment policy for the first CP may also be determined according to a preset rule (for example, an order) or randomly from the three CP adjustment policies corresponding to Cluster 2.

In S340, the eCoordinator may perform network optimization according to the determined first adjustment policy and second adjustment policy. If output (for example, corresponding parameters or policies in the second column, the third column, and the fourth column in Table 1 may be included) of an optimization algorithm determined according to the second adjustment policy is the same as the first adjustment policy, network optimization is implemented. For example, a CP corresponding to an adjustment policy (or referred to as an optimization algorithm) may be configured and delivered to the target cell, and the target cell completes adjustment of the CP; otherwise, network optimization is not implemented, and a suggestion of network optimization (for example, the first adjustment policy and the second adjustment policy) is submitted to an operator, and the operator performs processing.

In addition, after performing the foregoing network optimization, the eCoordinator may record the first network status parameter and network optimization corresponding to the first network status parameter. For example, if a network security status determined in a next period is secure, it may be considered that current optimization processing or a selected optimization algorithm is successful, and therefore the first network status parameter and the network optimization corresponding to the first network status parameter may be recorded in the Use Case entry and the adjustment policy entry.

In addition, if the second adjustment policy cannot be obtained, it indicates that the current problem is a new network problem, and an optimization algorithm is selected according to the first adjustment policy; if the first adjustment policy is also empty, a new algorithm needs to be designed, this requirement is submitted to an operator, and the operator performs processing.

It should be understood that the foregoing enumerated method for performing network optimization according to the first adjustment policy and the second adjustment policy is merely an exemplary description, and the present disclosure is not limited thereto. For example, network optimization may also be performed according to the use case recorded in the third column in Table 1 and the algorithm recorded in the fourth column in Table 1.

According to the network optimization method in this embodiment of the present disclosure, when a security status is insecure, an adjustment policy A corresponding to a current network status parameter is determined according to an entry that is acquired in advance; an adjustment policy B corresponding to the current network status parameter is determined according to a CP that is in a recorded secure network status parameter and that has a highest cell measurement parameter similarity with the current network status parameter; network optimization is performed by comparing the adjustment policy A and the adjustment policy B, so that accuracy of network processing can be improved; in addition, because the adjustment policy B provides a specific type and processing direction of a CP that needs to be processed, efficiency of network optimization can be improved.

Optionally, in this embodiment of the present disclosure, the KPI includes at least two dimensions of parameters in the following parameters: a throughput of a cell, a call loss rate of a cell, a call drop rate of a cell, and a handover performance parameter of a cell; and/or the cell measurement parameter includes at least two dimensions of parameters in the following parameters: a quantity of users of a cell, load of a cell, and interference of a cell.

That is, in this embodiment of the present disclosure, the acquired first network status parameter may include parameters of multiple dimensions (or referred to as types). In this case, dimension reduction processing may be performed on the first network status parameter.

Optionally, in this embodiment of the present disclosure, before the determining, according to the first network status parameter and from a first entry that records a mapping relationship between a network status parameter and a security status, a security status of each target cell in the first time segment, the method further includes:

performing first dimension reduction processing on the first network status parameter according to a mutual effect relationship between a KPI included in the first network status parameter and the first CP, and/or a mutual effect relationship between a cell measurement parameter included in the first network status parameter and the first CP.

Specifically, in this embodiment of the present disclosure, the eCoordinator may delete a KPI that is in the first network status parameter and is weakly correlated with the first CP, so as to reduce a quantity of KPI variables that need to be processed. As an implementation method, for example, a correlation between a first network status variable and the first CP may be detected by using a mutual information method, and a KPI variable that is in the first network status parameter and is weakly correlated with the first CP is selected and deleted.

That is, first, the eCoordinator may calculate mutual information I between the first CP and each KPI included in the first network status parameter.

The following formula 2 provides a method for calculating mutual information between two variables X and Y, where p(•) indicates a probability density function.

$$I(X;Y) = \sum_{x,y} p(x,y) \log \frac{p(x,y)}{p(x)p(y)} \qquad \text{Formula 2}$$

For a vector that has a multi-dimensional variable, for example, for a vector X with an N-dimensional variable and a vector Y with an M-dimensional variable, formula 3 provides a corresponding method for calculating mutual information.

$$I(X_1, \ldots, X_N; Y_1, \ldots, Y_M) = \qquad \text{Formula 3}$$
$$\sum_x \sum_y p(x_1, \ldots x_N, y_1, \ldots y_M)$$
$$\log \frac{p(x_1, \ldots x_N, y_1, \ldots y_M)}{p(x_1, \ldots x_N)p(y_1, \ldots y_M)}$$

In this embodiment of the present disclosure, a CP may be indicated by $x_1, \ldots, x_N$ and a KPI may be indicated by $y_1, \ldots, y_n$. A calculation result I(CP; KPI) is used to represent a mutual effect relationship between a CP and a KPI; a larger value indicates a stronger correlation between the CP and the KPI, and a smaller value indicates a weaker correlation between the CP and the KPI. In addition, a corresponding calculated $i^{th}$ KPI may be deleted from sampled data according to a preset threshold $I_{thr}$ (a magnitude of the threshold may be selected according to a policy of an operator) and the following formula 4, so as to reduce a quantity (or referred to as dimensions) of variables that need to be processed.

$$I(CP,KPI_i) < I_{thr}; i\epsilon[1, \ldots, M] \qquad \text{Formula 4:}$$

Similarly, in this embodiment of the present disclosure, a CP may be indicated by $x_1, \ldots, x_N$, and a cell measurement parameter may be indicated by $y_1, \ldots, y_N$. A calculation result I(CP; KPI) is used to represent a mutual effect relationship between a CP and a cell measurement parameter; a larger value indicates a stronger correlation between the CP and the cell measurement parameter, and a smaller value indicates a weaker correlation between the CP and the cell measurement parameter. In addition, a corresponding calculated $i^{th}$ cell measurement parameter may be deleted from sampled data according to a preset threshold $I_{thr}$ (a magnitude of the threshold may be selected according to a policy of an operator) and the foregoing formula 4, so as to reduce a quantity (or referred to as dimensions) of variables that need to be processed.

Before the determining, according to the first network status parameter and from a first entry that records a mapping relationship between a network status parameter and a security status, a security status of each target cell in the first time segment, the method further includes:

performing second dimension reduction processing on the first network status parameter according to a correlation between a KPI included in the first network status parameter and a cell measurement parameter included in the first network status parameter.

Specifically, in this embodiment of the present disclosure, the eCoordinator may select, by using, for example, a principal component analysis method, a KPI and a cell measurement parameter that are strongly correlated in the first network status parameter, so that an eigenvector of a network status is represented by a few principal components. A basic principle is that each principal component is corresponding to a linear combination of a KPI and a cell measurement parameter, the principal component analysis method is used and multiple KPIs and cell measurement parameters that are strongly correlated are represented by one principal component. Specific steps are as follows:

(1) An eCoordinator may determine, according to N KPIs and M cell measurement parameters included in a first network status parameter, M×N pieces of original data $\chi=[X_1, X_2, \ldots, X_N]$, where $X_n=[x_{n,1}, x_{n,2}, \ldots, x_{n,M}]^T$, $n \in [1, \ldots, N]$.

(2) Calculate an average value $[\overline{X}_1, \overline{X}_2, \ldots, \overline{X}_N]$ of each column vector in $\chi$, and then subtract the average value of each column vector from the original data $\chi$, so as to obtain M×N pieces of new data $\chi'=[X'_1, X'_2, \ldots, X'_N]=[X_1-\overline{X}_1, X_2-\overline{X}_2, \ldots, X_N-\overline{X}_N]$ (3) Calculate a covariance of $\chi'$, and generate a covariance matrix of Cov($\chi'$) of N×N.
U (4) Calculate, according to the covariance matrix Cov($\chi'$), N×N eigenvector matrices U, which are corresponding to each element $U_{i,j}$, i & j∈[1, ..., N] and a corresponding eigenvalue $u_i$, i∈[1, ..., N]; where each column vector $U_{k,j}$, k=1, ..., N; j∈[1, ..., N] in the eigenvector matrix is an eigenvector corresponding to the eigenvalue $u_j$.

(5) Sort eigenvectors $U_{k,j}$ in descending order of corresponding eigenvalues, find, according to a preset eigenvalue threshold $u_{thr}$, first P eigenvectors whose $u_i \geq u_{thr}$, i=1, ..., N, that is, P principal components, and generate an eigenvector matrix $\tilde{U}$ with a size of N×P which is corresponding to each element $\tilde{U}_{k,j}$, k∈[1, ..., N]; j∈[1, ..., P].

(6) Define a new network status variable matrix $\tilde{\chi}$ with a size of P×M, so that the P principal components are used to indicate the original network status matrix $\chi$, that is, $\tilde{\chi}=\tilde{U}^T \times \chi'^T$. Therefore, $\tilde{\chi}^T$ with a size of M×P is new data that is mapped from original sampled data to the P principal components and is used to describe a network status in a subsequent procedure.

(7) Establish a new correspondence between a control parameter and a network status: Change an original correspondence between each network status sampling point $x_{i,j}$, i∈[1, ..., M]; j∈[1, ..., N] and control parameter configuration $CP_k$ to a new correspondence between a network status sampling point $\tilde{\chi}$, i∈[1, ..., M]; j∈[1, ..., P] and the control parameter configuration $CP_k$.

Therefore, the eCoordinator may determine clusters to which a first network status parameter, on which the foregoing first dimension reduction processing and/or second dimension reduction processing are/is performed, belongs in the Use Case entry and the adjustment policy entry. The process and method are similar to the method for and process of determining the cluster to which the first network status parameter, on which dimension reduction processing is not performed, belongs.

It should be noted herein that, when the network status parameter (the second network status parameter) that has the highest cell measurement parameter similarity with the first network status parameter is determined, the first network status parameter on which dimension reduction processing is not performed needs to be used; that is, in this embodiment of the present disclosure, before performing the foregoing dimension reduction processing, the eCoordinator may store in advance the first network status parameter on which dimension reduction processing is not performed, so as to facilitate a subsequent operation.

Alternatively, the eCoordinator may further perform restoration on the first network status parameter on which the second dimension reduction processing is performed. For example, the eCoordinator may restore, according to the eigenvector feature $\tilde{U}^{-1}=\tilde{U}^T$, an N-dimensional network status variable $\chi$ from a P-dimensional network status parameter $\tilde{\chi}$, where $\chi'^T=(\tilde{U}^T)^{-1}\times \tilde{X}=\tilde{U}\times \tilde{X}$ and $X=[X'_1+\overline{X}_1, X'_2+\overline{X}_2, \ldots, X'_N+\overline{X}_N]$.

Optionally, in this embodiment of the present disclosure, the determining, according to the first network status parameter and from a first entry that records a mapping relationship between a network status parameter and a security status, a security status of each target cell in the first time segment includes:

performing clustering processing on the first network status parameter and a network status parameter that is acquired in a third time segment, so as to minimize a feature space distance between a member network status parameter and a central network status parameter that are in each generated cluster, where the third time segment is earlier than the first time segment;

determining a third network status parameter according to the first network status parameter, where the third network status parameter is a central network status parameter in a cluster to which the first network status parameter belongs; and determining, according to the third network status parameter and from the first entry, the security status of the target cell in the first time segment.

Specifically, in this embodiment of the present disclosure, clustering processing may be performed on the first network status parameter obtained in a current period and each network status parameter obtained in a previous period.

It should be noted herein that each recorded network status parameter may be a parameter on which dimension reduction processing is not performed, or may be a parameter on which dimension reduction processing is performed, and the present disclosure is not limited thereto. For ease of understanding and description, the following describes a method for performing clustering processing on parameters on which the first dimension reduction processing and the second dimension reduction processing are performed.

In this embodiment of the present disclosure, the eCoordinator may classify principal component variables with a similar feature into a same cluster, and use one cluster center to represent the feature of all variables in the cluster. It is assumed that network statuses have Nc clusters $\{C_j\}_{j=1}^{Nc}$ after principal component analysis is performed. Accordingly, this process is to classify sampled data $\tilde{X}_{i,j}$, i∈[1, ..., M]; j=1, ..., P of M principal components into Nc clusters, where Nc<<M. In cluster space, a row vector $\tilde{\chi}_i$, i∈[1, ..., M] of each principal component matrix $\tilde{X}$ is corresponding to one point; clustering is to classify M points into Nc clusters. Specifically, a principle of clustering is to minimize a space distance between each point and a cluster center in the cluster space, as shown in the following formula 5:

Formula 5:

$$\min_{U,V} J^\phi(U, V^\phi)$$

with $$J^\phi(U, V^\phi) = \sum_{j=1}^{Nc}\sum_{i=1}^{M} u_{ij}\|\phi(\tilde{X}_i) - V_j^\phi\|^2 + \sum_{j=1}^{Nc}\eta_j\sum_{i=1}^{M}(u_{ij}\ln(u_{ij}) - u_{ij})$$

where $u_{ij} \in [0,1]$ indicates a member probability that a sampling point $\tilde{X}$ is classified into a cluster center $V_j$; $U=(u_{ij}: i=1, \ldots, M; j=1, \ldots, Nc)$; $V=(v_j: j=1, \ldots, Nc)$; $V^\Phi$ is a cluster center set obtained after a cluster center set V is mapped to feature space by using a kernel function (for example, a Gaussian kernel function;) $\phi(\tilde{X}_i)$ is a new sampling point obtained after a sampling point $\tilde{X}_i$ is mapped to the characteristic space by using the same kernel function; $n_j$ is a customizable ambiguity parameter, for example, 0.1. For the foregoing formula 5, when $\partial J(U,V)/\partial u_{ij}=0$ and $\partial J(U,V)/\partial v_j=0$, an optimal cluster may be found. Specific clustering steps are as follows:

(A) Initialize a cluster. Nc sampling points with a largest probability density are selected as initial cluster centers by observing distribution of sampling points $\tilde{X}_i$.

(B) Initialize $u_{ij}$. That is, an initial member probability that each sampling point is classified into the initial cluster centers is obtained through calculation according to a space distance.

(C) Calculate, through iteration and according to the following formula 6 and formula 7, a cluster center and a member probability for the $t^{th}$ time.

Formula 6:

$$v_j^\phi(t) = \left(\sum_{i=1}^{M} u_{ij}(t-1)\right)^{-1} \cdot \frac{\sum_{i=1}^{M} u_{ij}(t-1)\phi(\tilde{X}_i)}{\sum_{i=1}^{M} u_{ij}(t-1)}$$

Formula 7:

$$u_{ij}(t) = \exp\left(-\frac{\|\phi(\tilde{X}_i) - v_j^\phi(t)\|}{\eta_j}\right)$$

(D) When $J_{U,V}{}^\Phi(t) - J_{U,V}{}^\Phi(t-1) \geq J_{thr}$ (where $J_{thr}$ is a preset threshold), return to step (C) so as to iteratively calculate a cluster center and a member probability for the $t+1^{th}$ time; otherwise, exist a cycle, and each cluster center and a member probability that each sampling point is classified into each cluster center are obtained.

Then, clustering and updating of a clustering database may be triggered periodically or in an event-triggered manner. A basic principle is similar to that of initial clustering, and a difference lies in that: in this case, in addition to $M_L$ existing clustering samples $\tilde{X}_i^L$, there are also $M_U$ new sample sets $\tilde{\chi}_i^U$, where $M=M_L+M_U$. Therefore, when new clustering is performed, a function that needs to be optimized is:

Formula 8:

$$\min_{U,V} J^\phi(U, V^\phi)$$

with $$J^\phi(U, V^\phi) = \sum_{j=1}^{Nc}\sum_{i=1}^{M_L}(u'_{ij} - u_{ij})\left(\|\phi(\tilde{X}_i^L) - V_j^\phi\|^2 - \|\phi(\tilde{X}_i^L) - V'^\phi_j\|^2\right) +$$

$$\sum_{j=1}^{Nc}\sum_{i=1}^{M_U} u'_{ij}\|\phi(\tilde{X}_i^U) - V'^\phi_j\|^2$$

where an updated member probability of each sampling point of an updated cluster is $u'_{ij}$; accordingly, an updated cluster center is $V'_j$.

Therefore, as described above, a cluster center (which may also be referred to as a central network status parameter, that is, the third network status parameter) of the cluster to which the first network status parameter belongs may be determined.

Therefore, the security status (or referred to as the security status in the first time segment) corresponding to the first network status parameter may be determined from the Use Case entry according to the third network status parameter, and the adjustment policy corresponding to the first network status parameter may be determined from the adjustment policy entry according to the third network status parameter. Because optimization processing is already performed on the third network status parameter in a previous period, clusters to which the third network status parameter belongs in the Use Case entry and in the adjustment policy entry may be recorded, so that the security status corresponding to the first network status parameter and the adjustment policy corresponding to the first network status parameter can be easily obtained, which improves efficiency of network optimization in the present disclosure.

The foregoing enumerates a complete procedure of performing network optimization on one target cell. In a case in which there are multiple target cells, processing is similar to the foregoing procedure; it should be noted that, in this case, an obtained CP adjustment policy and optimization algorithm need to be delivered to base station devices of all cells, and the base station devices of all the cells are set according to the foregoing CP adjustment policy and adjustment algorithm.

In addition, in a case in which there are multiple target cells, dimensions of each group of network status parameters that are acquired from a base station device of each cell may be enabled to be consistent, and dimensions of each group of CPs that are acquired from a base station device of each cell may be enabled to be consistent, so as to improve an effect of optimization processing.

According to the network optimization method in this embodiment of the present disclosure, a current running status of a network is represented by using a KPI that is used to indicate running performance of a cell, and a cell measurement parameter that is used to indicate service distribution of a cell and/or a resource usage status of a cell, and network optimization is performed, which can accurately represent the current running status of the network, reliably reflect a problem with the network, and therefore can reduce an investment of human resources costs, improve accuracy in triggering an optimization algorithm, and improve an effect of network optimization.

Figure 4:
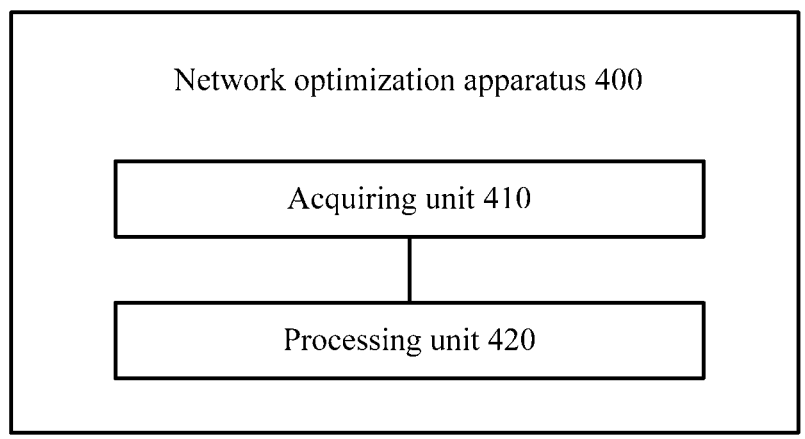
FIG. 4 is a schematic block diagram of a network optimization apparatus according to an embodiment of the present disclosure.

The foregoing describes in detail, with reference to FIG. 1 to FIG. 3, the network optimization method according to the embodiments of the present disclosure. The following describes in detail, with reference to FIG. 4, a network optimization apparatus according to an embodiment of the present disclosure. FIG. 4 is a schematic block diagram of a network optimization apparatus 400 according to an embodiment of the present disclosure. As shown in FIG. 4, the apparatus 400 includes:

an acquiring unit 410, configured to: acquire, in a first time segment, a first network status parameter that is determined according to M groups of network status parameters of at least one target cell, and acquire a first CP that is determined according to M groups of cell control parameters CPs of the target cell, where the network status parameters include a cell statistics key performance parameter KPI and a cell measurement parameter, the KPI is used to indicate running performance of a cell, the cell measurement parameter is used to indicate service distribution of a cell and/or a resource usage status of a cell, the CP is used to indicate base station setting of a cell, the M groups of network status parameters are respectively acquired by means of M times of sampling, the M groups of CPs are respectively acquired by means of M times of sampling, and the M groups of CPs and the M groups of network status parameters are in a one-to-one correspondence; and a processing unit 420, configured to: determine, according to the first network status parameter acquired by the acquiring unit 410 and from a first entry that records a mapping relationship between a network status parameter and a security status, a security status of each target cell in the first time segment; and perform network optimization on the target cell according to the security status of the target cell in the first time segment.

Optionally, the acquiring unit 410 is specifically configured to: acquire the M groups of network status parameters from the target cell; and acquire the first network status parameter by performing statistics collection and averaging processing on the M groups of network status parameters;

acquire the M groups of CPs from the target cell; and acquire the first CP by performing statistics collection and averaging processing on the M groups of CPs.

Optionally, the acquiring unit 410 is specifically configured to: acquire the first network status parameter from the target cell, where the first network status parameter is obtained after statistics collection and averaging processing are performed on the M groups of network status parameters in the target cell; and acquire the first CP from the target cell, where the first CP is obtained after statistics collection and averaging processing are performed on the M groups of CPs in the target cell.

Optionally, the processing unit 420 is specifically configured to: if the security status of the target cell in the first time segment is secure, record a mapping relationship between the first network status parameter and the first CP.

Optionally, the processing unit 420 is specifically configured to: if the security status of the target cell in the first time segment is insecure, determine, from network status parameters recorded in a second time segment, a second network status parameter that has a highest cell measurement parameter similarity with the first network status parameter, where the second time segment is earlier than the first time segment, and a security status of the target cell in the second time segment is secure;

determine a first adjustment policy for the first CP according to a second CP corresponding to the second network status parameter;

determine, according to the first network status parameter, a second adjustment policy for the first CP from a second entry that records a mapping relationship between a network status parameter and a CP adjustment policy; and perform network optimization on the target cell according to the first adjustment policy and the second adjustment policy.

Optionally, the processing unit 420 is specifically configured to determine the second adjustment policy from the second entry according to the first network status parameter and the first adjustment policy.

Optionally, the KPI includes at least one dimension of parameter in the following parameters: a throughput of a cell, a call loss rate of a cell, a call drop rate of a cell, and a handover performance parameter of a cell;

the cell measurement parameter includes at least one dimension of parameter in the following parameters: a quantity of users of a cell, load of a cell, and interference of a cell; and the CP includes at least one dimension of parameter in the following parameters: transmit power of a base station, an antenna downtilt of a base station, and a handover parameter of a cell.

Optionally, the KPI includes at least two dimensions of parameters in the following parameters: a throughput of a cell, a call loss rate of a cell, a call drop rate of a cell, and a handover performance parameter of a cell; and/or the cell measurement parameter includes at least two dimensions of parameters in the following parameters: a quantity of users of a cell, load of a cell, and interference of a cell.

Optionally, the processing unit 420 is further configured to perform first dimension reduction processing on the first network status parameter according to a mutual effect relationship between a KPI included in the first network status parameter and the first CP, and/or a mutual effect relationship between a cell measurement parameter included in the first network status parameter and the first CP.

Optionally, the processing unit 420 is further configured to perform second dimension reduction processing on the first network status parameter according to a correlation between a KPI included in the first network status parameter and a cell measurement parameter included in the first network status parameter.

Optionally, the processing unit 420 is further configured to: perform clustering processing on the first network status parameter and a network status parameter that is acquired in a third time segment, so as to minimize a feature space distance between a member network status parameter and a central network status parameter that are in each generated cluster, where the third time segment is earlier than the first time segment;

determine a third network status parameter according to the first network status parameter, where the third network status parameter is a central network status parameter in a cluster to which the first network status parameter belongs; and determine, according to the third network status parameter and from the first entry, the security status of the target cell in the first time segment.

Optionally, the processing unit 420 is specifically configured to: if the security status of the target cell in the first time segment is insecure, determine, from the network status parameters recorded in the second time segment, the second network status parameter that has the highest cell measurement parameter similarity with the first network status parameter, where the second time segment is earlier than the first time segment, and the security status of the target cell in the second time segment is secure;

determine the first adjustment policy for the first CP according to the second CP corresponding to the second network status parameter;

determine, according to the third network status parameter, a third adjustment policy for the first CP from the second entry that records the mapping relationship between a network status parameter and a CP adjustment policy; and perform network optimization on the target cell according to the first adjustment policy and the third adjustment policy.

Optionally, the processing unit 420 is further configured to determine the third adjustment policy from the second entry according to the third network status parameter and the first adjustment policy.

The network optimization apparatus 400 according to this embodiment of the present disclosure may be corresponding to the eCoordinator in the method in an embodiment of the present disclosure. In addition, units, that is, modules, in the network optimization apparatus 400 and the foregoing other operations and/or functions are separately for implementing corresponding procedures of the method 100 in FIG. 1. For brevity, details are not described herein again.

According to the network optimization apparatus in this embodiment of the present disclosure, a current running status of a network is represented by using a KPI that is used to indicate running performance of a cell, and a cell measurement parameter that is used to indicate service distribution of a cell and/or a resource usage status of a cell, and network optimization is performed, which can accurately represent the current running status of the network, reliably reflect a problem with the network, and therefore can reduce an investment of human resources costs, improve accuracy in triggering an optimization algorithm, and improve an effect of network optimization.

In addition, according to the network optimization apparatus in this embodiment of the present disclosure, when a security status is insecure, an adjustment policy A corresponding to a current network status parameter is determined according to an entry that is acquired in advance; an adjustment policy B corresponding to the current network status parameter is determined according to a CP that is in a recorded secure network status parameter and that has a highest cell measurement parameter similarity with the current network status parameter; network optimization is performed by comparing the adjustment policy A and the adjustment policy B, so that accuracy of network processing can be improved; in addition, because the adjustment policy B provides a specific type and processing direction of a CP that needs to be processed, efficiency of network optimization can be improved.

Figure 5:
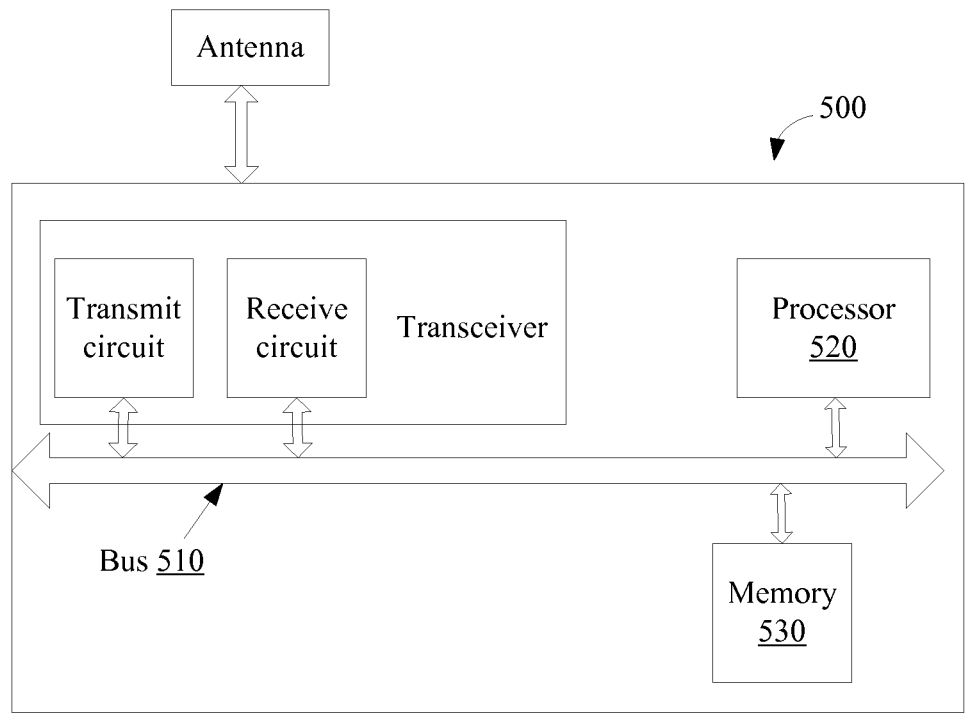
FIG. 5 is a schematic block diagram of a network optimization device according to an embodiment of the present disclosure.

The foregoing describes in detail, with reference to FIG. 1 to FIG. 3, the network optimization method according to the embodiments of the present disclosure. The following describes in detail, with reference to FIG. 5, a network optimization device according to an embodiment of the present disclosure. FIG. 5 shows a schematic block diagram of a network optimization device 500 according to an embodiment of the present disclosure. As shown in FIG. 5, the device 500 includes:

a bus 510;

a processor 520 connected to the bus 510; and a memory 530 connected to the bus 510.

The processor 520 invokes, by using the bus 510, a program stored in the memory 530, so as to: acquire, in a first time segment, a first network status parameter that is determined according to M groups of network status parameters of at least one target cell, and acquire a first CP that is determined according to M groups of cell control parameters CPs of the target cell, where the network status parameters include a cell statistics key performance parameter KPI and a cell measurement parameter, the KPI is used to indicate running performance of a cell, the cell measurement parameter is used to indicate service distribution of a cell and/or a resource usage status of a cell, the CP is used to indicate base station setting of a cell, the M groups of network status parameters are respectively acquired by means of M times of sampling, the M groups of CPs are respectively acquired by means of M times of sampling, and the M groups of CPs and the M groups of network status parameters are in a one-to-one correspondence;

determine, according to the first network status parameter and from a first entry that records a mapping relationship between a network status parameter and a security status, a security status of each target cell in the first time segment; and perform network optimization on the target cell according to the security status of the target cell in the first time segment.

Optionally, the processor 520 is specifically configured to: acquire the M groups of network status parameters from the target cell;

acquire the first network status parameter by performing statistics collection and averaging processing on the M groups of network status parameters;

acquire the M groups of CPs from the target cell; and acquire the first CP by performing statistics collection and averaging processing on the M groups of CPs.

Optionally, the processor 520 is specifically configured to: acquire the first network status parameter from the target cell, where the first network status parameter is obtained after statistics collection and averaging processing are performed on the M groups of network status parameters in the target cell; and acquire the first CP from the target cell, where the first CP is obtained after statistics collection and averaging processing are performed on the M groups of CPs in the target cell.

Optionally, the processor 520 is specifically configured to: if the security status of the target cell in the first time segment is secure, record a mapping relationship between the first network status parameter and the first CP.

Optionally, the processor 520 is specifically configured to: if the security status of the target cell in the first time segment is insecure, determine, from network status parameters recorded in a second time segment, a second network status parameter that has a highest cell measurement parameter similarity with the first network status parameter, where the second time segment is earlier than the first time segment, and a security status of the target cell in the second time segment is secure;

determine a first adjustment policy for the first CP according to a second CP corresponding to the second network status parameter;

determine, according to the first network status parameter, a second adjustment policy for the first CP from a second entry that records a mapping relationship between a network status parameter and a CP adjustment policy; and perform network optimization on the target cell according to the first adjustment policy and the second adjustment policy.

Optionally, the processor 520 is specifically configured to determine the second adjustment policy from the second entry according to the first network status parameter and the first adjustment policy.

Optionally, the KPI includes at least one dimension of parameter in the following parameters: a throughput of a cell, a call loss rate of a cell, a call drop rate of a cell, and a handover performance parameter of a cell;

the cell measurement parameter includes at least one dimension of parameter in the following parameters: a quantity of users of a cell, load of a cell, and interference of a cell; and the CP includes at least one dimension of parameter in the following parameters: transmit power of a base station, an antenna downtilt of a base station, and a handover parameter of a cell.

Optionally, the KPI includes at least two dimensions of parameters in the following parameters: a throughput of a cell, a call loss rate of a cell, a call drop rate of a cell, and a handover performance parameter of a cell; and/or the cell measurement parameter includes at least two dimensions of parameters in the following parameters: a quantity of users of a cell, load of a cell, and interference of a cell.

Optionally, the processor 520 is further configured to perform first dimension reduction processing on the first network status parameter according to a mutual effect relationship between a KPI included in the first network status parameter and the first CP, and/or a mutual effect relationship between a cell measurement parameter included in the first network status parameter and the first CP.

Optionally, the processor 520 is further configured to perform second dimension reduction processing on the first network status parameter according to a correlation between a KPI included in the first network status parameter and a cell measurement parameter included in the first network status parameter.

Optionally, the processor 520 is further configured to: perform clustering processing on the first network status parameter and a network status parameter that is acquired in a third time segment, so as to minimize a feature space distance between a member network status parameter and a central network status parameter that are in each generated cluster, where the third time segment is earlier than the first time segment;

determine a third network status parameter according to the first network status parameter, where the third network status parameter is a central network status parameter in a cluster to which the first network status parameter belongs; and determine, according to the third network status parameter and from the first entry, the security status of the target cell in the first time segment.

Optionally, the processor 520 is specifically configured to: if the security status of the target cell in the first time segment is insecure, determine, from the network status parameters recorded in the second time segment, the second network status parameter that has the highest cell measurement parameter similarity with the first network status parameter, where the second time segment is earlier than the first time segment, and the security status of the target cell in the second time segment is secure;

determine the first adjustment policy for the first CP according to the second CP corresponding to the second network status parameter;

determine, according to the third network status parameter, a third adjustment policy for the first CP from the second entry that records the mapping relationship between a network status parameter and a CP adjustment policy; and perform network optimization on the target cell according to the first adjustment policy and the third adjustment policy.

Optionally, the processor 520 is specifically configured to determine the third adjustment policy from the second entry according to the third network status parameter and the first adjustment policy.

It should be understood that, in this embodiment of the present disclosure, the processor 520 may be a central processing unit (Central Processing Unit, "CPU" for short), or the processor 520 may be another general-purpose processor, a digital signal processor (DSP), an application specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The processor 520 controls an operation of the device 500, and the processor 520 may also be referred to as a CPU. The memory 530 may include a read-only memory and a random access memory, and provide an instruction and data to the processor 520. A part of the memory 530 may further include a non-volatile random access memory (NVRAM). In specific application, the device 500 may be built in or the device 500 itself may be, for example, a base station device, and may further include a transceiver that accommodates a transmit circuit and a receive circuit, so as to allow data transmission and reception between the device 500 and a remote position. The transmit circuit and the receive circuit may be coupled to an antenna. Components of the device 500 are coupled together by using the bus 510. In addition to a data bus, the bus 510 further includes a power bus, a control bus, a status signal bus, and the like. However, for clarity, various buses are marked as the bus 510 in the figure. The device 500 may further include a processor configured to process a signal, and in addition, the device 500 further includes a power controller and a decoding processor. In different specific products, a decoder may be integrated with a processor.

The memory 530 may include a read-only memory and a random access memory, and provide an instruction and data to the processor 520. A part of the memory 530 may further include a non-volatile random access memory.

In addition to a data bus, the bus system 510 may further include a power bus, a control bus, a status signal bus, and the like. However, for clarity, various buses are marked as the bus system 510 in the figure.

In an implementation process, steps of the foregoing method may be implemented by using an integrated logic circuit of hardware in the processor 520 or an instruction in a form of software. The steps of the method disclosed with reference to the embodiments of the present disclosure may be directly executed by a hardware processor, or executed by using a combination of a hardware module and a software module in a processor. The software module may be located in a mature storage medium in the art, such as a random access memory, a flash memory, a read-only memory, a programmable read-only memory, an electrically erasable programmable memory, or a register. The storage medium is located in the memory 530, and the processor 520 reads information in the memory 530 and completes the steps of the foregoing method in combination with hardware of the processor 530. To avoid repetition, details are not described herein again.

The network optimization device 500 according to this embodiment of the present disclosure may be corresponding to the eCoordinator in the method in an embodiment of the present disclosure. In addition, units, that is, modules, in the network optimization device 500 and the foregoing other operations and/or functions are separately for implementing corresponding procedures of the method 100 in FIG. 1. For brevity, details are not described herein again.

According to the network optimization device in this embodiment of the present disclosure, a current running status of a network is represented by using a KPI that is used to indicate running performance of a cell, and a cell measurement parameter that is used to indicate service distribution of a cell and/or a resource usage status of a cell, and network optimization is performed, which can accurately represent the current running status of the network, reliably reflect a problem with the network, and therefore can reduce an investment of human resources costs, improve accuracy in triggering an optimization algorithm, and improve an effect of network optimization.

In addition, according to the network optimization device in this embodiment of the present disclosure, when a security status is insecure, an adjustment policy A corresponding to a current network status parameter is determined according to an entry that is acquired in advance; an adjustment policy B corresponding to the current network status parameter is determined according to a CP that is in a recorded secure network status parameter and that has a highest cell measurement parameter similarity with the current network status parameter; network optimization is performed by comparing the adjustment policy A and the adjustment policy B, so that accuracy of network processing can be improved; in addition, because the adjustment policy B provides a specific type and processing direction of a CP that needs to be processed, efficiency of network optimization can be improved.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are implemented by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network optimization method, comprising:
acquiring, in a first time segment, a first network status parameter that is determined according to M groups of network status parameters of at least one target cell, and acquiring a first cell control parameter (CP) that is determined according to M groups of CPs of the at least one target cell, wherein the network status parameters comprise a key performance parameter (KPI) and a cell measurement parameter, the KPI is used to indicate running performance of a cell, the cell measurement parameter is used to indicate service distribution of the cell or a resource usage status of the cell, the first CP is used to indicate base station setting of a cell, the M groups of the network status parameters are respectively acquired by means of M times of sampling, the M groups of CPs are respectively acquired through M times of sampling, and the M groups of CPs and the M groups of network status parameters are in a one-to-one correspondence;

determining, according to the first network status parameter and from a first entry that records a first mapping relationship between a network status parameter and a security status, a security status of the at least one target cell in the first time segment; and performing network optimization on the at least one target cell according to the security status of the at least one target cell in the first time segment; wherein M is a positive integer.

2. The method according to claim 1, wherein the acquiring the first network status parameter that is determined according to the M groups of the network status parameters of the at least one target cell comprises:

acquiring the first network status parameter from the target cell, wherein the first network status parameter is obtained after statistics collection and averaging processing are performed on the M groups of the network status parameters in the target cell; and wherein the acquiring the first CP that is determined according to the M groups of the CPs of the at least one target cell comprises:

acquiring the first CP from the target cell, wherein the first CP is obtained after the statistics collection and the averaging processing are performed on the M groups of CPs in the at least one target cell.

3. The method according to claim 1, wherein the performing the network optimization on the target cell according to the security status of the at least one target cell in the first time segment comprises:

when the security status of the target cell in the first time segment is insecure, determining, from network status parameters recorded in a second time segment, a second network status parameter that has a highest cell measurement parameter similarity with the first network status parameter, wherein the second time segment is earlier than the first time segment, and a security status of the target cell in the second time segment is secure;

determining a first adjustment policy for the first CP according to a second CP associated with the second network status parameter;

determining, according to the first network status parameter, a second adjustment policy for the first CP from a second entry that records a second mapping relationship between the network status parameter and a CP adjustment policy; and performing the network optimization on the at least one target cell according to the first adjustment policy and the second adjustment policy.

4. The method according to claim 3, wherein the determining the second adjustment policy for the first CP comprises:

determining the second adjustment policy from the second entry according to the first network status parameter and the first adjustment policy.

5. The method according to claim 1, wherein the KPI comprises at least one dimension of parameter in the following parameters: a throughput of a cell, a call loss rate of a cell, a call drop rate of a cell, and a handover performance parameter of a cell;

the cell measurement parameter comprises at least one dimension of parameter in the following parameters: a quantity of users of a cell, load of a cell, and interference of a cell; and the CP comprises at least one dimension of parameter in the following parameters: transmit power of a base station, an antenna down tilt of a base station, and a handover parameter of a cell.

6. The method according to claim 1, wherein the KPI comprises at least two dimensions of parameters in the following parameters: a throughput of a cell, a call loss rate of a cell, a call drop rate of a cell, and a handover performance parameter of a cell; and/or the cell measurement parameter comprises at least two dimensions of parameters in the following parameters: a quantity of users of a cell, load of a cell, and interference of a cell.

7. The method according to claim 6, wherein before the determining the security status of the target cell in the first time segment, the method further comprises:

performing first dimension reduction processing on the first network status parameter according to at least one of (a) a mutual effect relationship between a KPI comprised in the first network status parameter and the first CP, and (b) a mutual effect relationship between a cell measurement parameter comprised in the first network status parameter and the first CP.

8. The method according to claim 6, wherein before the determining the security status of the target cell in the first time segment, the method further comprises:

performing second dimension reduction processing on the first network status parameter according to a correlation between the KPI comprised in the first network status parameter and a cell measurement parameter comprised in the first network status parameter.

9. The method according to claim 1, wherein the determining the security status of the target cell in the first time segment comprises:

performing clustering processing on the first network status parameter and a network status parameter that is acquired in a third time segment, so as to minimize a feature space distance between a member network status parameter and a central network status parameter that are in each generated cluster, wherein the third time segment is earlier than the first time segment;

determining a third network status parameter according to the first network status parameter, wherein the third network status parameter is a central network status parameter in a cluster to which the first network status parameter belongs; and determining, according to the third network status parameter and from the first entry, the security status of the target cell in the first time segment.

10. The method according to claim 9, wherein the performing network optimization on the target cell according to the security status of the target cell in the first time segment comprises:

when the security status of the target cell in the first time segment is insecure, determining, from the network status parameters recorded in a second time segment, a second network status parameter that has a highest cell measurement parameter similarity with the first network status parameter, wherein the second time segment is earlier than the first time segment, and the security status of the target cell in the second time segment is secure;

determining the first adjustment policy for the first CP according to the second CP corresponding to the second network status parameter;

determining, according to the third network status parameter, a third adjustment policy for the first CP from the second entry that records a third mapping relationship between the network status parameter and a CP adjustment policy; and performing the network optimization on the at least one target cell according to the first adjustment policy and the third adjustment policy.

11. A network optimization device, comprising:
a bus;
a processor connected to the bus; and
a memory connected to the bus; wherein:
the processor invokes, by using the bus, a program stored in the memory, so as to: acquire, in a first time segment, a first network status parameter that is determined according to M groups of network status parameters of at least one target cell, and acquire a first cell control parameter (CP) that is determined according to M groups of CPs of the at least one target cell, wherein the network status parameters comprise a key performance parameter (KPI) and a cell measurement parameter, the KPI is used to indicate running performance of a cell, the cell measurement parameter is used to indicate at least one of service distribution of the cell and a resource usage status of the cell, the first CP is used to indicate base station setting of the cell, the M groups of the network status parameters are respectively acquired through M times of sampling, the M groups of the CPs are respectively acquired through the M times of sampling, and the M groups of the CPs and the M groups of the network status parameters are in a one-to-one correspondence;
determine, according to the first network status parameter and from a first entry that records a first mapping relationship between a network status parameter and a security status, a security status of the at least one target cell in the first time segment; and
perform network optimization on the at least one target cell according to the security status of the at least one target cell in the first time segment;
wherein M is a positive integer.

12. The device according to claim 11, wherein the processor is configured to acquire the first network status parameter from the target cell, wherein the first network status parameter is obtained after statistics collection and averaging processing are performed on the M groups of the network status parameters in the target cell; and
acquire the first CP from the target cell, wherein the first CP is obtained after the statistics collection and the averaging processing are performed on the M groups of CPs in the target cell.

13. The device according to claim 11, wherein the processor is configured to: when the security status of the target cell in the first time segment is insecure, determine, from network status parameters recorded in a second time segment, a second network status parameter that has a highest cell measurement parameter similarity with the first network status parameter, wherein the second time segment is earlier than the first time segment, and a security status of the at least one target cell in the second time segment is secure;
determine a first adjustment policy for the first CP according to a second CP associated with the second network status parameter;
determine, according to the first network status parameter, a second adjustment policy for the first CP from a second entry that records a second mapping relationship between the network status parameter and a CP adjustment policy; and perform the network optimization on the at least one target cell according to the first adjustment policy and the second adjustment policy.

14. The device according to claim 13, wherein the processor is configured to determine the second adjustment policy from the second entry according to the first network status parameter and the first adjustment policy.

15. The device according to claim 11, wherein the KPI comprises at least one dimension of parameter in the following parameters: a throughput of a cell, a call loss rate of a cell, a call drop rate of a cell, and a handover performance parameter of a cell;
the cell measurement parameter comprises at least one dimension of parameter in the following parameters: a quantity of users of a cell, load of a cell, and interference of a cell; and
the CP comprises at least one dimension of parameter in the following parameters: transmit power of a base station, an antenna downtilt of a base station, and a handover parameter of a cell.

16. The device according to claim 11, wherein the KPI comprises at least two dimensions of parameters in the following parameters: a throughput of a cell, a call loss rate of a cell, a call drop rate of a cell, and a handover performance parameter of a cell; and/or
the cell measurement parameter comprises at least two dimensions of parameters in the following parameters: a quantity of users of a cell, load of a cell, and interference of a cell.

17. The device according to claim 16, wherein the processor is further configured to perform first dimension reduction processing on the first network status parameter according to at least one of (a) a mutual effect relationship between a KPI comprised in the first network status parameter and the first CP, and (b) a mutual effect relationship between a cell measurement parameter comprised in the first network status parameter and the first CP.

18. The device according to claim 16, wherein the processor is further configured to perform second dimension reduction processing on the first network status parameter according to a correlation between the KPI comprised in the first network status parameter and a cell measurement parameter comprised in the first network status parameter.

19. The device according to claim 11, wherein the processor is further configured to: perform clustering processing on the first network status parameter and a network status parameter that is acquired in a third time segment, so as to minimize a feature space distance between a member network status parameter and a central network status parameter that are in each generated cluster, wherein the third time segment is earlier than the first time segment;
determine a third network status parameter according to the first network status parameter, wherein the third network status parameter is a central network status parameter in a cluster to which the first network status parameter belongs; and
determine, according to the third network status parameter and from the first entry, the security status of the target cell in the first time segment.

20. The device according to claim 19, wherein the processor is configured to: when the security status of the target cell in the first time segment is insecure, determine, from the network status parameters recorded in a second time segment, a second network status parameter that has a highest cell measurement parameter similarity with the first network status parameter, wherein the second time segment is earlier than the first time segment, and the security status of the target cell in the second time segment is secure;
- determine the first adjustment policy for the first CP according to a second CP associated with the second network status parameter;
- determine, according to the third network status parameter, a third adjustment policy for the first CP from the second entry that records a third mapping relationship between the network status parameter and a CP adjustment policy; and
- perform the network optimization on the at least one target cell according to the first adjustment policy and the third adjustment policy.

\* \* \* \* \*